United States Patent [19]
Johnson et al.

[11] B 3,987,493

[45] Oct. 19, 1976

[54] STYLUS FOR RECORDING ON HEAT SENSITIVE MATERIAL

[75] Inventors: Curtis R. Johnson, Flourtown; Albert E. Paschkis, Gwynedd Valley, both of Pa.

[73] Assignee: Leeds & Northrup Company, North Wales, Pa.

[22] Filed: Mar. 19, 1975

[21] Appl. No.: 560,261

[44] Published under the second Trial Voluntary Protest Program on March 16, 1976 as document No. B 560,261.

[52] U.S. Cl. .......................... 346/139 C; 346/76 R; 338/28
[51] Int. Cl.² ................. G01D 15/16; G01D 15/10; H01C 7/02
[58] Field of Search ...................... 346/76 R, 139 C; 343/22, 28

[56] References Cited
UNITED STATES PATENTS 3,402,378   9/1968   Catlin et al. .......................... 338/28
3,699,588  10/1972   Warrington et al. ............. 346/139 C
3,735,417   5/1973   Holzhauser ..................... 346/139 C

*Primary Examiner*—George H. Miller, Jr.
*Attorney, Agent, or Firm*—William G. Miller, Jr.; Raymond F. MacKay

[57] ABSTRACT

A hot stylus using a mandrel of soft material having good heat conductivity and good electrical conductivity is used to carry heat to the writing end of the mandrel. That end fits in an aperture of a jewel bearing surface which rides on the heat sensitive paper. The mandrel is soldered in a groove along a thermistor having a positive temperature coefficient. The mandrel also provides one electrical connection to the thermistor. The other electrical connection is by way of a foil contact soldered to an opposite face of the thermistor. That assembly is potted and assembled on a circuit board which provides the electrical leads from the stylus body to which the foil is soldered and from the mandrel itself.

10 Claims, 2 Drawing Figures

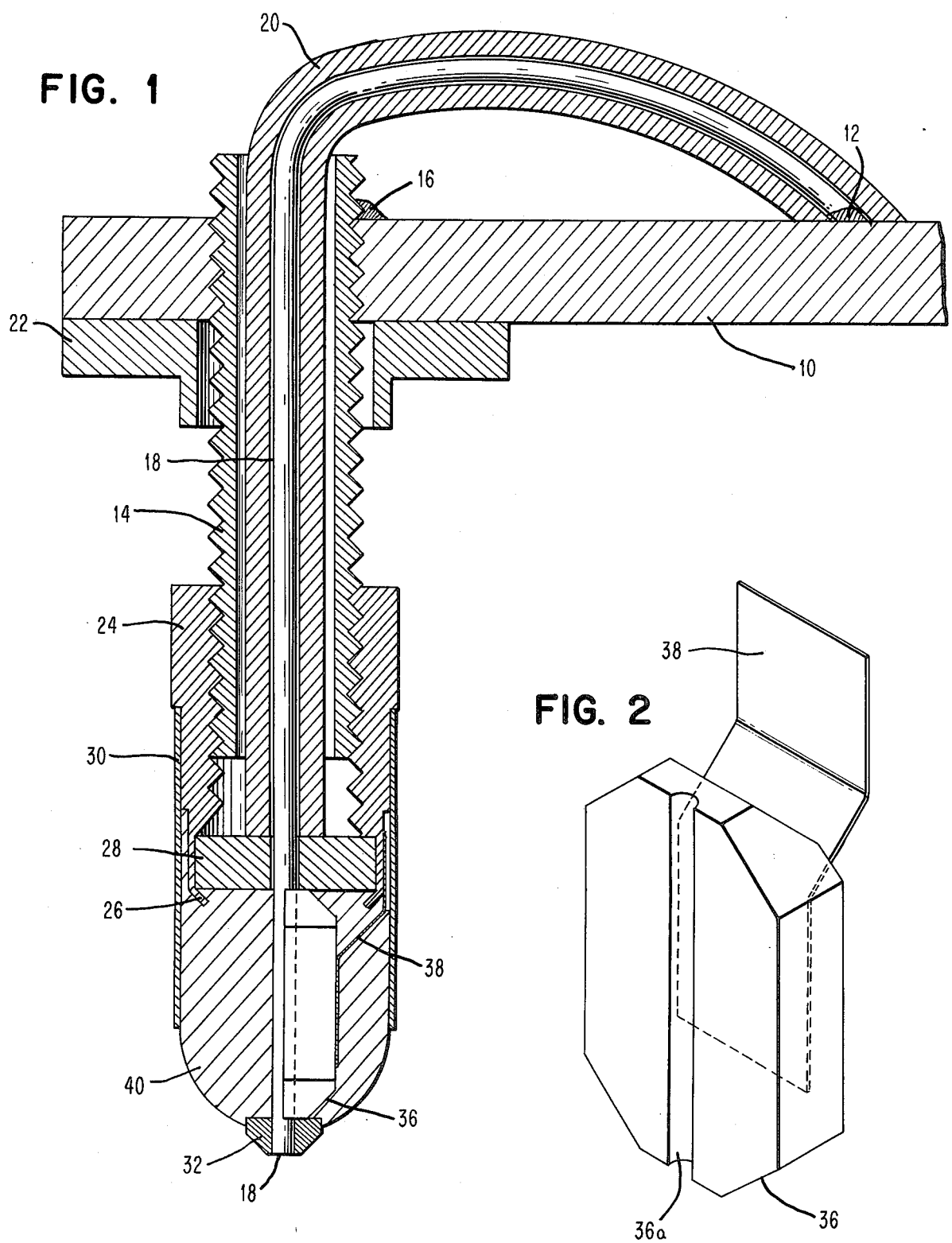

STYLUS FOR RECORDING ON HEAT SENSITIVE MATERIAL

BACKGROUND OF THE INVENTION

This invention relates to recording stylii for use in recording on heat sensitive material. Recorders for producing a visible trace on a recording medium such as heat sensitive paper are well known in the art as evidenced, for example, by U.S. Pat. No. 3,735,417. In the prior art, however, as for example in the above mentioned patent, the hot stylus is not adequate to provide operation over a substantial range of ambient temperature conditions while at the same time providing a large range of writing speeds and the ability to operate continuously over a long period of time without significant wear.

It is therefore an object of this invention to provide an improved recording stylus for recording on heat sensitive material.

SUMMARY OF THE INVENTION

In carrying out the above object there is provided a recording stylus for recording on heat sensitive material such as heat sensitive paper. This stylus includes a solid mandrel of material having both good heat conductivity and good electrical conductivity. The assembly that forms the stylus also includes a tip member of material providing minimum heat transmission consistent with good wear resistance and a low friction coefficient with the heat sensitive material. The tip member has an aperture for receiving the writing end of the mandrel so that the mandrel may be flush with the surface of the tip member as may be necessary to contact the heat sensitive material as the tip member rides on the material. A thermistor with a positive temperature coefficient is provided. The thermistor is assembled so as to intimately contact the mandrel over a portion of its surface for efficient heat transfer to the mandrel when a current is passed through the thermistor by way of the electrical connection therewith. The electrical conducting path through said thermistor is provided from a conductor in electrical connection with one area of the thermistor, thence through the thermistor and through the mandrel which is in electrical contact with the thermistor. The elements mentioned above are potted to maintain the parts in their assembled positions thereby forming a rigid stylus assembly.

BRIEF DESCRIPTION OF THE DRAWINGS

FIG. 1 is a cross-section of the stylus assembly of the present invention.

FIG. 2 is a perspective view of the thermistor and the foil lead providing one of its electrical connections.

DESCRIPTION OF THE PREFERRED EMBODIMENT

FIG. 1 shows the hot stylus assembly of the present invention mounted on a support formed by a printed circuit card 10. That printed circuit card provides two leads for connecting the stylus electrically for circuit connection at the right hand end of the card. One lead from the right hand end terminates at a point 12 while the other lead terminates in the area where the threaded bushing 14 screws into the circuit card. The electrical connection is provided by depositing solder at 16 which provides electrical connection between the bushing 14 and one lead in the circuit card.

The threaded bushing 14 has inserted through its hollow center a mandrel 18 which extends from the distal end to the proximal end of the stylus assembly and to the point 12 on the printed circuit card where it is soldered to a contact point for one lead of the circuit card. In the preferred embodiment of this invention the mandrel 18 is preferably made of silver or copper and therefore it will be soft enough for the appropriate bending which is necessary to have it make contact with the circuit card after it leaves the end of the bushing 14. The mandrel will also have good electrical conductivity and good heat conductivity as is necessary to perform its dual function as an electrical conductor and the writing part of a hot stylus.

In FIG. 1 the mandrel is shown covered over a part of its length by an insulating sleeve 20 which may, for example, be of a woven fiberglass sleeve which provides electrical insulation between the mandrel and the bushing 14.

The bushing 14 is assembled with the circuit card 10 by having a threaded engagement, as shown. To supplement that engagement with the card there is provided a shoulder washer 22.

An end of threaded bushing 14 is engaged in threaded relationship with the stylus support bushing 24 which may, for example, be made of brass. That bushing has its ends crimped as at 26 to retain the ceramic washer 28 while the outer periphery of the bushing supports a section of tubing 30 which may, for example, be aluminum. That section of tubing defines the peripheral area of the distal end of the stylus assembly.

In the distal end of the stylus assembly, which is the end which contacts the heat sensitive material for writing thereon, the end of the mandrel 18 is assembled in the aperture of a tip member 32 so that it initially protrudes slightly from the lower surface of the tip member, namely that surface which will normally ride over the heat sensitive material when the stylus is writing thereon. It is preferable to so assemble the stylus so that as the stylus is used the relatively soft tip member which, as mentioned, can be of silver, will wear appropriately as the stylus records on the heat sensitive material and the end of mandrel will after a short period of use be substantially flush with the lower surface of the tip member.

The tip member is preferably made of material which provides as much heat insulation as possible consistent with the requirement that it be long wearing and have a low friction coefficient with the recording material. Thus, the tip member should be smooth and of sufficiently hard material so that it will not wear under the condition of constant moving contacts with the heat sensitive material. It is therefore preferred that the tip member be a ruby or a sapphire, for example.

To provide for the heating of the mandrel so that its writing end may record on the heat sensitive material with which it will be in contact in its normal use there is provided a thermistor 36, which should be a thermistor having a positive temperature coefficient. The thermistor is used in a selfheating, self-regulating mode.

Electrical contact with the thermistor is provided by its having intimate contact with the mandrel over a surface provided by a groove in the thermistor which is semi-cylindrical in configuration. That groove accepts the mandrel and is preferably soldered thereto so that current can flow through the mandrel to the thermistor. The other electrical contact to the thermistor is provided by a foil contact 38 which is soldered to the thermistor over a sufficient surface area to give the necessary contact therewith and is also soldered to the stylus support bushing 24 which is in threaded engagement with the bushing 14 thus providing a path for electric current from the thermistor through the foil 38, bushing 24 and the bushing 14 to one lead of the circuit card.

The end portion of the stylus assembly which does the writing is then encapsulated with a potting compound 40 leaving the writing end of the mandrel and the surrounding surface of the tip member exposed for contact with the material to be recorded on. The potting which serves to protect the assembly elements and maintain them fixed in their appropriate positions as shown while avoiding unnecessary heat conduction from the mandrel thus maximizing the heating of the mandrel and hence the ability of the distal end of the mandrel to record on the heat sensitive material.

With the construction shown in the figure and described above there is provided a stylus for recording on heat sensitive material using a positive temperature coefficient thermistor in a self-heating, self-regulating mode with the heated mandrel being of soft material and the wearing qualities of the stylus being provided by the wear-resistant jewel surrounding the mandrel. It will be evident that with this assembly the optimum stylus material can be selected for good heat conductivity and good electrical conductivity without consideration as to its wear resistant qualities since the surrounding jewel material provides for the wear resistant, low friction characteristic desirable in recording stylii.

All of the elements of the stylus assembly of FIG. 1 are symmetrical about the vertical axis of the assembly with the exception of the circuit card 10 and the thermistor 36 and its associated foil contact 38. It is unnecessary for clarity to show in detail the circuit card 10 since its function has been amply described above. There is, however, shown in FIG. 2 a perspective view of the thermistor and its associated foil contact so that it will be clearly evident as to the shape of the thermistor 36 and the manner in which the foil contact 38 is assembled therewith. In FIG. 2 it can be seen that the thermistor 36 has a vertical groove 36a. The groove 36a is, as shown, shaped to be semi-cylindrical so that it can be soldered to the mandrel 18 over a substantial area.

As shown in FIG. 2, the foil contact 38 is soldered to the back face of the thermistor over a substantial area 44.

What is claimed is:
1. A recording stylus assembly for recording on heat sensitive material, comprising
   a solid mandrel of material having good heat conductivity,
   a tip member of material providing good wear resistance, a low friction coefficient with said material and low heat conductivity, said member having an aperture for receiving the writing end of said mandrel so that it will contact the surface of said material when the tip member rides on the material during recording thereon, and
   a thermistor having a positive temperature coefficient, said thermistor being assembled in position to intimately contact said mandrel over a portion of the surface of the thermistor for efficient heat transfer to the mandrel when electrical current is passed through said thermistor.

2. A stylus as set forth in claim 1 in which the mandrel is silver.

3. A stylus as set forth in claim 1 in which the tip member is made from a hard insulating material.

4. A stylus as set forth in claim 1 in which the mandrel is soldered to said thermistor to provide one electrical contact therewith and another contact is soldered to said thermistor to complete the electrical circuit through said thermistor.

5. A stylus as set forth in claim 1 in which the elements as assembled are encapsulated in a potting compound so as to expose only the writing end of said mandrel and the surface of said tip member which rides on the heat sensitive material.

6. A recording stylus assembly for recording on heat sensitive material, comprising
   a solid mandrel of material having both good heat conductivity and good electrical conductivity,
   a tip member of material providing good wear resistance, a low friction coefficient with said material and low heat conductivity, said member having an aperture for receiving the writing end of said mandrel so that it will contact the surface of said material when the tip member rides on the material during recording thereon,
   a thermistor having a positive temperature coefficient, said thermistor being assembled in position to intimately contact said mandrel over a portion of the surface of the thermistor for efficient heat transfer to the mandrel and for electrical connection therewith,
   electrical conducting means connected to said thermistor over a portion of the surface of the thermistor spaced from that portion in contact with said mandrel, and
   potting means encapsulating said mandrel, said tip and said thermistor for protecting said assembly and minimizing heat loss therefrom while exposing the end of said mandrel and the surrounding surface of said tip for recording contact with said material.

7. A stylus as set forth in claim 6 in which the mandrel is cylindrical in the region in contact with the thermistor and the thermistor has a circular groove for providing intimate contact between the cylindrical mandrel and the thermistor.

8. A stylus as set forth in claim 6 in which the mandrel is made of silver and the tip member is made of a hard insulating material.

9. A stylus as set forth in claim 8 which includes a bushing with the assembled elements mounted thereon, and a circuit board to which said bushing is in threaded engagement.

10. A stylus as set forth in claim 9 in which the circuit board carries two conductors, the first of said conductors being electrically connected to said bushing, said bushing in turn being electrically connected to said electrical conducting means and the second of said conductors being electrically connected to said mandrel at the end opposite its writing end.

* * * * *